INVENTOR.
HERBERT WALDMAN

[signature]

ATTORNEYS

AUTOMATIC TELEPHONE ANSWERING APPARATUS WITH REMOTE PLAYBACK

Filed May 9, 1966

INVENTOR.
HERBERT WALDMAN

ATTORNEYS

AUTOMATIC TELEPHONE ANSWERING APPARATUS WITH REMOTE PLAYBACK

Filed May 9, 1966

3 Sheets-Sheet 3

INVENTOR.
HERBERT WALDMAN

ATTORNEYS 3,508,004
AUTOMATIC TELEPHONE ANSWERING APPARATUS WITH REMOTE PLAYBACK

Herbert Waldman, Brooklyn, N.Y., assignor to Robosonics, Inc., Bronx, N.Y., a corporation of Delaware Filed May 9, 1966, Ser. No. 548,585
Int. Cl. H04m *11/10*
U.S. Cl. 179—6 6 Claims

ABSTRACT OF THE DISCLOSURE

In a telephone answering apparatus having means to playback a recorded message in response to the ringing of a telephone, means to record incoming messages on a tape, and remotely operated means to playback said recorded incoming telephone messages, means to terminate said playback of said recorded incoming telephone messages, said terminating means comprising index tone responsive means operable in response to a pre-recorded index tone to terminate said playback of said recorded messages.

The present invention relates to an automatic telephone answering apparatus which has provision to play back the recorded messages over the telephone line in response to the receipt of a coded signal over the telephone line, and in particular to an automatic telephone answering apparatus in which the playback is terminated at the completion of the playback of the last-recorded message.

In telephone answering apparatus of the prior art, the ringing of the telephone at the subscriber's station initiates a normal answering cycle during which a pre-recorded message is first reproduced over the telephone line, and thereafter a recording device is actuated so as to receive a message over the telephone line. In addition, such a prior art device had provision for playing back previously recorded messages over the telephone line in response to a coded signal initiated by the subscriber from a point remote from his telephone station. However, the apparatus would continue to play back until all of the recording tape was used up, since there was no means for indicating the termination of the last of the recorded messages.

In view of the foregoing, it is an object of the present invention to provide a telephone answering and recording apparatus which will have means for terminating the playback of the recorded messages.

Pursuant to the foregoing object of the present invention, it is another object to provide means for utilizing a previously recorded signal on the recording tape as an index marker signal to terminate the playback of the previously recorded messages. Pursuant to this feature of the present invention, the tone originates and is recorded on the tape when the subscriber provides a code signal to his answering apparatus by means of a tone generator; or the terminating signal may be provided by suitable circuitry incorporated within the telephone answering apparatus which operates in response to an authorized code signal transmitted over the telephone line.

It is another object of the present invention to provide means whereby a previously recorded index signal or tone, which indicates the termination of the last prior recorded message, does not interfere or prevent the playback of a subsequently recorded message. Pursuant to this feature of the present invention, it is another object to provide means whereby a previously recorded index signal is erased by the subsequent recording of a message received after the completion of a prior message playback sequence.

It is another object of the present invention to prohibit a tone frequency coinciding with the index signal frequency from causing interference with any other specific operation of the answering apparatus, other than the termination of the playback of the previously recorded messages.

It is another object of the present invention to prevent spurious or random signals having the same frequency as the code or indexing signal from triggering the code signal or index signal responsive circuits.

It is another object of the present invention to provide for the recording of an adequate time interval of the index tone signal on the message tape.

It is another object of the present invention to provide a selective mechanism whereby the telephone subscriber may retain the previously recorded and play-back messages on the recording tape until he returns to his station; or to provide for the erasure of previously played-back messages by the subsequent recording of incoming messages. In accordance with the foregoing object of the present invention, it is a more specific object to provide for a two-position switch which, in a first or "ACCUMULATE" position thereof, will cause the recording tape to rewind for a short interval only after the playback of the previously recorded messages; and which in a second or a "ZERO" position will cause the message tape to completely rewind to its initial or starting position.

The foregoing ability of the apparatus to operate either in a zero mode or an accumulate mode provides a prime advantage to the device pursuant to the present invention. By setting the selection switch in its zero position, the capacity of the apparatus for recording incoming calls is potentially unlimited. In each playback of the previously recorded messages in response to the transmission of a coded signal by the subscriber, the recording tape is returned to its initial starting position. As a result, the subscriber need not return to his station or office for weeks or months at a time to rewind the tape. On the other hand, with the selecion switch in the accumulate position, the subscriber may continuously receive a playback of the previously recorded messages from any remote telephone station, or upon his return to the office, before deciding to erase such previously recorded messages. Moreover, in the accumulate position of the apparatus, it is evident that any number of authorized individuals can effect the remote playback of the previously recorded messages, and can himself record messages for other authorized individuals.

Pursuant to still another object of the present invention, the decoding device may consist of any suitable tuned circuit which can be activated electronically, mechanically or pneumatically in accordance with methods well-known in the prior art. For example, in this connection the decoding device may be constituted by a whistle or by a battery-powered tuned electronic circuit.

A still further object of the present invention is to provide an apparatus of the type previously described which can be manufactured from a minimum number of conventional parts, and which will have a long and efficient operating life.

Other and further objects and advantages of the present invention will be readily apparent to one skilled in the art from a consideration of the following specification, taken in connection with the appended drawings.

In the drawings, which illustrate the best modes presently contemplated for carrying out the present invention—

A telephone answering apparatus pursuant to the present invention is based upon telephone answering and recording apparatus of conventional design and well-known in the prior art. Consequently, only those portions of such prior art apparatus which are necessary for an understanding of the present invention are illustrated and described. The various components of the answering apparatus pursuant to the present invention, such as the ringing responsive and actuating means 100, the starting contacts 101, the telephone answering and audio transmission means 102, the reproducing means and the recording means, are each well-known in the prior art, and are fully illustrated and described in United States Patent No. 3,127,474, and copending application Ser. No. 355,746, filed Mar. 30, 1964, in addition to the sequencing and cycling control means for programming the routine cycle of operations of the apparatus.

Figure 1:
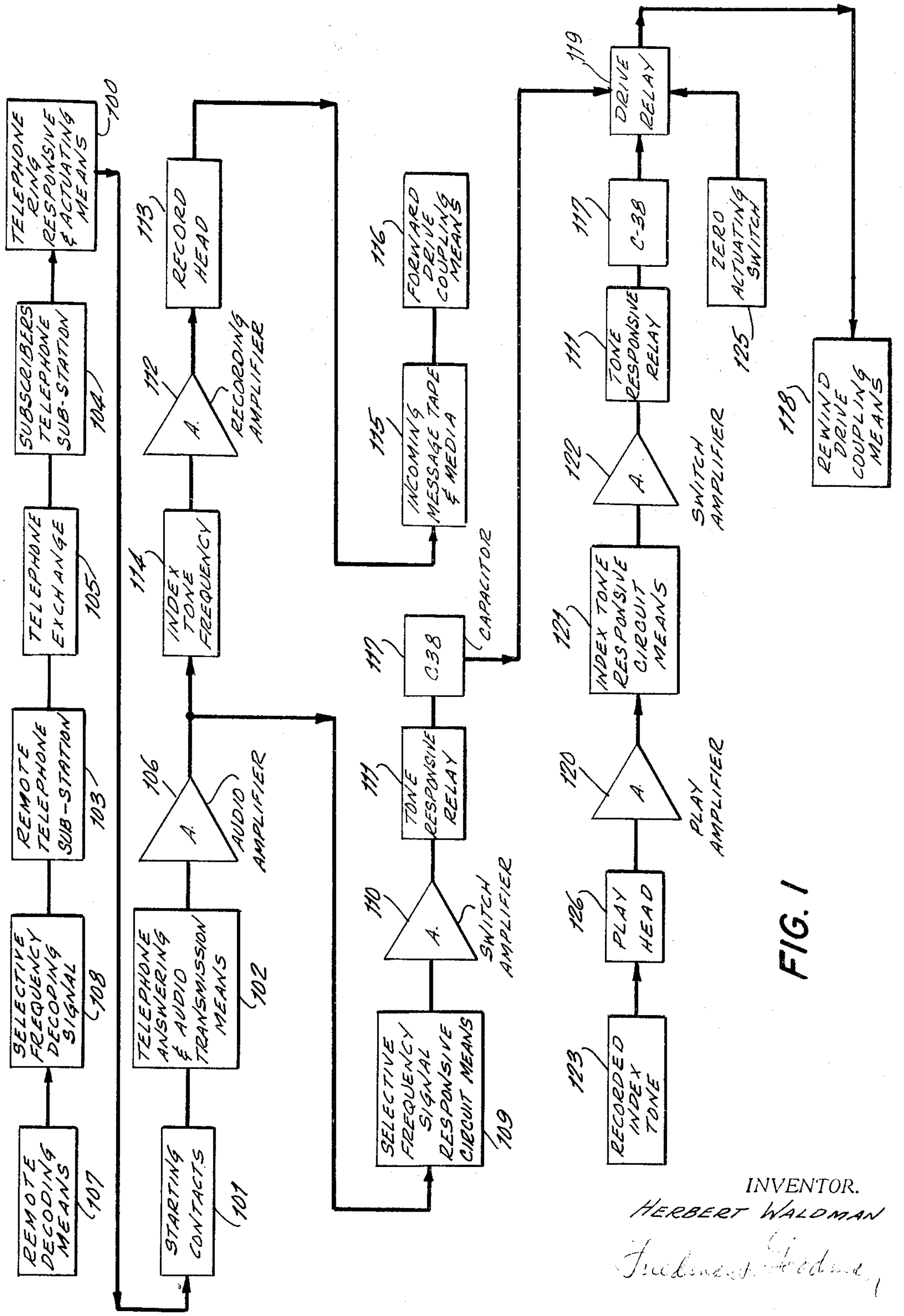
FIGURE 1 is a block diagram of a telephone recording and answering apparatus pursuant to the present invention, whereby the frequency signal or tone which is recorded for indexing the message tape originates from an external decoding device.

Referring now to FIGURE 1 in detail, the calling telephone subscriber initiates a telephone call from a remote telephone substation 103 to his subscriber substation 104. The call is completed in conventional manner through the telephone central office 105. The answering apparatus located at the subscriber substation responds to the telephone ring by answering the call and playing back a prerecorded announcement to the calling party over the telephone line, as fully described in the previously identified patent and co-pending patent application. This operation is effected by the telephone ring responsive and actuation means 100, the starting contacts 101, the telephone answering and audio transmission means 102, and the audio amplifier 106. The answering tape media and transport mechanism are of conventional design and, therefore, are not included in FIGURE 1.

At the completion of the prerecorded announcement, which invites the caller to have his message recorded, the telephone answering apparatus is automatically switched into a recording condition as is well-known in the prior art. The subscriber now decodes the telephone answering apparatus by activating a remote decoding means 107 which transmits a predetermined selective decoding signal 108 over the telephone lines. The predetermined frequency signal is received by the subscriber's telephone substation 104 and is detected by a selective signal responsive circuit means 109. The output of the circuit means 109 is applied to a switching amplifier 110 which in turn, energizes a tone responsive relay (T.R.) 111. Simultaneously with its introduction into the selective frequency signal responsive means 109, the decoding signal is also applied to the recording amplifier 112 and through the latter to the recording head 113 so as to record an index tone 114 onto the message recording tape 115. During this sequence of operation, the message tape is driven in a forward direction by the forward drive coupling means 116. The energization and closure of the tone responsive relay 111 result in the charging of a capacitor C38 which is indicated by the reference numeral 117. The charging of said capacitor is a means for the actuation of a rewind drive coupling means 118 in response to the discharge of the capacitor C38 into the drive relay coil 119. The discharge operation of the capacitor C38 and the operation of the drive relay 119 are described in detail in connection with FIGURE 3. The rewind drive coupling means 118 operates to propel the message tape in the opposite direction so as to rewind the latter. At the completion of the tape rewind operation, the tape resumes its normal forward movement so as to play back the previously recorded messages to the calling subscriber. The playback operation is effected by means of the play head 126 and the play amplifier 120 over the telephone lines by means of the audio transmission means 102, as is well-known in the prior art. However, pursuant to the state of the prior art, the tape would continue to move for its entire extent throughout said forward movement in the described playback operation until the end of the tape. However, this is prevented by means of the present invention. Pursuant to the present invention, when the predetermined decoding signal is played back, the playback operation of the recording apparatus is automatically terminated. This is effected in the following manner.

The index tone responsive circuit means 121 operates in response to the playback of the decoding signal or index tone to energize the switch amplifier 122. This results in the energization of the tone response relay 111 which again results in the charge/discharge operation of the capacitor C38 (117) which operates the drive relay 119 to energize the rewind drive coupling means 118, as is described in detail in connection with the subsequent description of FIGURE 3. The manner in which the rewind operation is terminated is also described in detail in connection with FIGURE 3. At the termination of the rewind operation, the telephone answering apparatus is automatically reset into a standby state in readiness to answer subsequent incoming telephone calls. The manner in which the apparatus in automatically reset into its standby state is not part of the present invention and, consequently, is not described herein; but it will be understood that this may be accomplished in any suitable manner well known in the prior art.

The conventional erase head is not illustrated in FIGURE 1. However, it will be readily apparent to one skilled in the art and as is well known in conventional recording practice, upon a recording of subsequent incoming calls the previously recorded index signal or tone 123 will be erased from the recording tape 115. Thus, on the recording tape 115 it is only the most recently recorded index tone or signal which is recorded on the tape, so as to indicate the termination of the last-recorded message on the tape.

Figure 2:
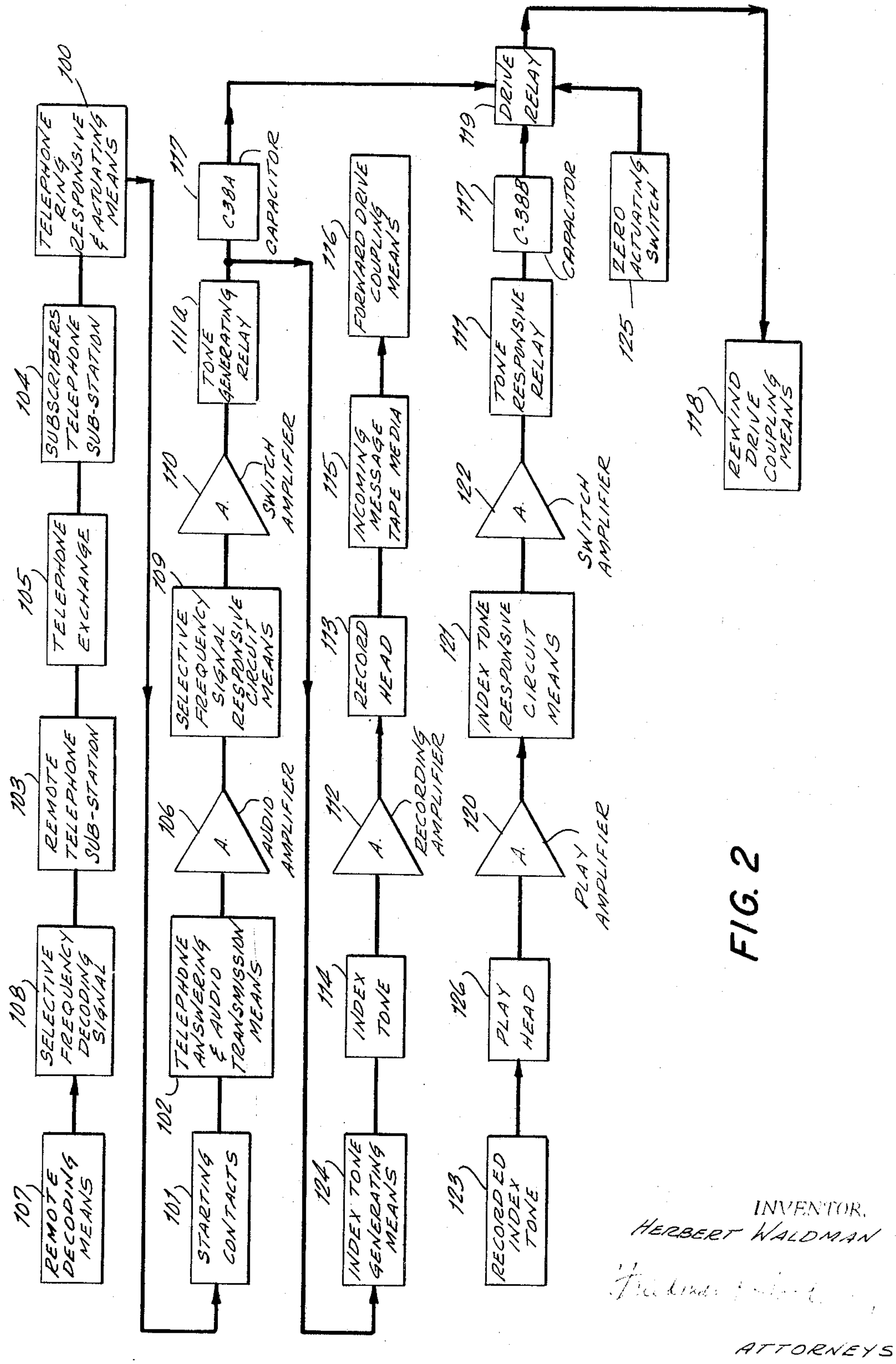
FIGURE 2 is a block diagram of an apparatus pursuant to the present invention, in which the frequency tone which is recorded for indexing the message tape originates from an internal tone generating circuit network.

Referring now to FIGURE 2 in detail, there is illustrated a telephone answering apparatus which operates basically in the same manner as that illustrated in FIGURE 1. However, the origin of the recorded index tone 114 in FIGURE 2 is different than the origin of the recorded index 114 in FIGURE 1, it being understood that similar reference numerals indicate similar parts or stages in both of said figures. In the embodiment illustrated in FIGURE 2, the transmitted decoding signal 108 provides the energizing signal to actuate an internal frequency generating circuit, namely, the index tone generating means 124. Said index tone generating means 124 operates to generate an index tone 114 which is of a frequency different from the frequency generated by the remote decoding means 107. It will be apparent from the prior discussion with respect to FIGURE 1, that for indexing purposes there is recorded the output signal which is generated on remote actuation of the remote decoding means 107. However, in the embodiment illustrated in FIGURE 2, the recorded index tone is generated by a second internal tank circuit which is constituted by the index tone generating means 124 which operates in response to actuation by the remote decoding means 107. As between the two different methods for providing the recorded index tone 123, the method resulting from the utilization of the apparatus embodied in FIGURE 2 appears to have various advantages.

If abnormal electric power source conditions exist at the time that the index tone is recorded, such abnormal conditions will affect in the same manner both the tape transport mechanism and the second internal tank circuit contained in the index tone generating circuit means 124, so that any abnormal conditions applying to one such element will be offset by equal in-phase abnormal conditions applying to the other element.

There may be differences in the ambient temperature conditions which exist at the point of remote decoding and at the location of the answering apparatus. This may affect the embodiment illustrated in FIGURE 1, but will have not effect on the embodiment illustrated in FIGURE 2, as will hereinafter appear. Similarly, differences in ambient temperature conditions may result in differences in the performance of the apparatus from the time of the recording of the index tone to the time of its subsequent playback. More specifically, as a result of very low temperatures prevailing at the time the index tone is being recorded, the startup speed of the transport mechanism may be below normal speed at the time of the recording of the index tone. However, after having operated for some time, the transport mechanism will stabilize and resume its normal speed. As a result, the recorded index tone will be at an incorrect frequency on its playback and fail to operate the intended frequency responsive circuit tank means. However, the foregoing disadvantage is obviated if the recorded index tone originates from a second internal tank circuit due to the fact that the second circuit is subject to the same atmospheric conditions as the transport mechanism, and will be affected in the same manner thereby, so that both elements will be in phase with each other and thereby obviate any imbalance that may otherwise exit between them. However, it is possible that different climatic conditions may exist where the remote decoder output signal is utilized directly to record the index tone, as may be the case when the remote decoder is situated at a location subject to varying atmospheric conditions which adversely affect the decoder mechanism as contrasted with the atmospheric conditions which prevail at the point where the answering apparatus is located.

Consider also the situation where the remote decoder, for some reason, is actuated but fails to decode successfully the answering apparatus. Under such circumstances, the decoding signal has been recorded on the message tape, which thus is provided with an improper index tone which will improperly affect a subsequent successful coding by causing a premature termination of the repeatback of the remotely recorded messages. Where the recorded index tone originates from the actuation of a second tank circuit contained within the telephone answering apparatus, a miscoding will have no adverse effect on the completion by a subsequent successful coding of the playback of the remotely recorded messages. This results from the fact that the index signal which is generated by the second tank circuit, is at a frequency which is different from the decoding signal which is generated by the decoder. The second tank circuit is not keyed to the decoding signal and consequently will not register or be responsive on its playback. In addition, where a second tank circuit is used, such improper registry of an index tone cannot occur coincident with a miscoding due to the fact that the tank circuit will become operative only upon a successful coding. An inoperative remote decoding transmission will not cause actuation of the second tank circuit to generate a tone for indexing purposes.

Figure 3:
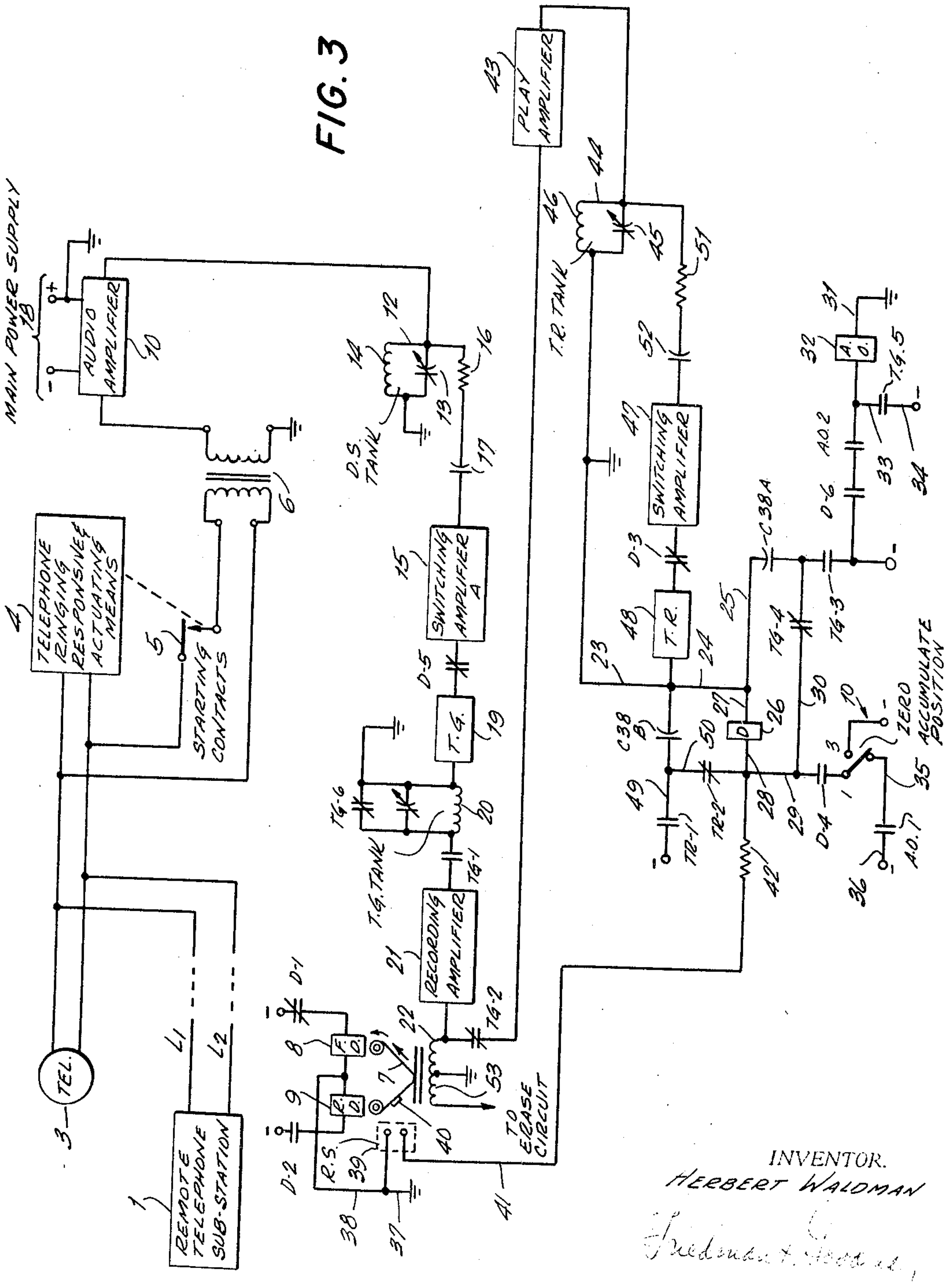
FIGURE 3 is a schematic diagram of those portions of the circuitry involved in the decoding and message repeat operations of the embodiment illustrated in FIGURE 2.

As previously indicated, FIGURE 3 illustrates a circuit diagram used in connection with the embodiment illustrated in FIGURE 2. FIGURE 3 utilizes the detached contact type of notation. In this form of notation, the normal unoperated condition of relay contacts is designated by "| |" if open (make contacts) and by "| |" if closed (break contacts). The foregoing type of notation is illustrated and described in detail in an article entitled "An Improved Detached Contact Type of Circuit Drawing," by F. T. Meyer, appearing in the A.I.E.E. Transactions, for September 1955, vol. 74, pages 505–513.

The circuit is energized by a DC power supply 18 having a negative and a positive terminal, as indicated.

It will be noted that the positive terminal is grounded. Each wire in the circuit which bears a ground designation is presumed to be connected to the positive terminal, and each wire which bears a negative designation is presumed to extend to the negative terminal.

In utilizing the apparatus illustrated in FIGURE 3, the subscriber initiates a call from a remote telephone substation 1 which is transmitted over the telephone company lines L1 and L2 to operate his telephone set 3 at the subscriber's station. The ringing of the telephone set 3 energizes the telephone ringing responsive and actuating means 4 so as to actuate the answering apparatus. The starting contacts 5 close in response to the actuation of the actuating means 4. The closing of the starting contacts 5 complete a circuit through the answering and audio transmission means which comprises the transformer 6 which is connected across the telephone lines. Consequently, it will be apparent that the energization of the transformer 6 simulates the answering of the telephone. The prerecorded announcement is transmitted and coupled to the telephone lines L1 and L2 by the transformer 6. In conventional manner, the telephone answering apparatus is converted into its recording condition at the completion of the recorded announcement. As previously indicated, the apparatus for playing back the announcement and the control circuits for converting the apparatus from a playback condition into a recording condition are well known in the art, and are fully described in the previously mentioned patent and copending patent application. These conventional components have been omitted from FIGURE 3.

The forward drive magnetic coupling means 8 controls the forward drive of the message tape 7. A rewind drive coupling means 9 controls the rewind drive of the tape 7. With the circuit rendered operative by the closing of the starting contacts 5, the calling subscriber may decode the apparatus to provide a remote playback of any messages which have been recorded on the message tape 7. As previously described in connection with each of FIGURES 1 and 2, the decoding is effected by activation of a remote decoding mechanism 107 which operates to generate a decoding signal is applied through the telephone company lines L1 and L2 to the telephone set 3 at the subscriber's station. With the starting contacts 5 closed, the remote signal is applied also to the coupling transformer 6. From the output of the transformer 6 the decoding signal is applied to the audio amplifier 10 where it is amplified. The audio amplifier 10 amplifies the decoding signal and feeds it into the decoding signal resonant tank circuit 12 (D.S.). The tank circuit is constituted by a variable capacitor 13 and an inductance 14. The tank circuit is tuned to the frequency of the correct coding signal. Consequently, if a coding signal arrives which is not at the correct frequency, it will not be passed beyond the tank circuit 12. However, if the decoding signal is of proper frequency, then it passes through the tank circuit 12 and is applied to a switching amplifier A15. Before being introduced to the switching amplifier 15, the output of the tank circuit passes through a time constant circuit constituted by the resistor 16 and the capacitor 17. The time constant provided by the time constant circuit introduces a delay of approximately one-half a second between the tank circuit and the switching amplifier 15, so that the switching amplifier cannot be energized prior to the one-half second delay.

The time constant relay circuit serves as a protector device so as to prevent random signal frequencies, which are of the same frequency as the decoding signal, from inadvertently passing through the tank circuit 12 and energizing the switching amplifier 15 to provide an unauthorized playback of the recorded messages. As a result, random signal frequencies which are of the same frequency as the decoding signal will not cause an inadvertent playback of the recorded messages, unless they are of the same duration as the decoding signals, As a result, the decoding signals must have a proper time duration in view of the time constant circuit 16 and 17. For this purpose, the subscriber is instructed to sustain the transmission of the decoding signal for an adequate time interval. The correct time internal for the decoding signal is hereinafter discussed in detail in connection with the playback of the index tone recorded on the message tape.

The energization of the switching amplifier 15 energizes the relay coil T.G.–19 through the normally closed relay contacts D–5. A tone generating tank circuit (T.G.) 20 is normally shorted by the normally closed relay contacts T.G.–6. However, upon energization of the relay coil T.G.–19, the contacts T.G.–6 open to render the tank circuit 20 operative. As a result, the tank circuit 20 generates a tone of predetermined frequency. The frequency of the tone generated by the tank circuit 20 is different from the frequency of the decoding signal. The output tone developed by the T.G. tank 20 is applied to the recording amplifier 21, and the amplified output thereof is applied to the record playhead 22, whereby it is recorded on the message tape 7. The energization of the relay T.G.–19 creates a charging path for the capacitor C38A. Said charging path extends from ground through leads 23, 24 and 25, through the capacitor C38A, and through the closed make contacts T.G.–3 of T.G. relay 19, to the negative terminal of power supply 18.

The T.G. relay also operates the accumulate operate (A.O.) relay 32 as follows: from ground through lead 31, through the coil of A.O. relay 32, through lead 33, through the make contacts T.G.–5 of relay T.G.–19, through lead 34 and the negative power supply terminal. The A.O. relay is of the slow release characteristic type, that is, after power is removed from its coil a delay exists before the relay contacts return to their relaxed condition.

The function of the A.O. relay will become evident in connection with the drive relay (D) 26 holding path to be described hereinafter.

After the decoding signal transmission ceases, the switching amplifier 15 is deenergized. This results in deenergizing the T.G. relay 19. The deenergization of the T.G. relay 19 establishes a discharge path for the charged capacitor C38A through the coil of the drive relay 26. This discharge circuit is traced in the following manner.

From capacitor C38A through leads 25 and 27, through the coil of the drive relay 26 through the leads 28, 29 and 30, through the closed contacts T.G.–4 of relay T.G.–19 to the other side of capacitor C38A and thus operating the drive relay 26. The drive relay establishes a holding path for itself through the holding contacts D–4 in the following manner:

From ground through leads 23, 24 and 27, through the coil of relay 26, through lead 28, through lead 29 through the make contacts D–4 of the drive relay, through the movable contact of switch 10 to the stationary contact thereof through lead 35, and through the make contacts A.O.–1 of relay 32 to the negative supply terminal. There is also established a holding path for the relay A.O.–32 as follows:

From ground through lead 31, through the relay coil of relay 32, through the closed contacts A.O.–2 of relay 32 and D–6 of drive relay 26 to the negative supply terminal. The energization of the drive relay 26 results in the deenergization of the forward drive magnetic coupling 8. This results from the fact that upon deenergization of the relay 26, its normally closed contacts D–1 are opened and the normally opened contacts D–2 of the drive relay are closed. As a result, the circuit for the forward drive coupling 8 is opened, and the circuit for the rewind drive coupling 9 is closed, from the ground terminal, through the lead 37, through the lead 38, through the coil of rewind drive coupling 9, and through the closed contacts D–2 of drive relay 26, to the negative terminal of the power supply line. As a result, the message tape 7 is wound in a reverse direction. Close to the end thereof, the magnetic tape 7 is provided with a conductive strip 40. Consequently, when the magnetic tape is fully rewound the conductive strip 40 bridges the rewind sensing terminals 39 to short the drive relay coil 26 so as to deactivate the latter. The shorting path starts from ground and extends through the sensing terminals 39 which are bridged by the conductive strip 40 through the lead 41, through a limiting resistor 42, through the lead 28, through the coil of the drive relay 26, and through leads 27, 24 and 23 to ground. The deenergization of the drive relay 26 results in the opening of its contacts D–6, so as to deenergize relay A.O.–32.

The closed contacts D–2 of drive relay 26 also open so as to open the energizing circuit for the rewind drive relay 9, and closes its contacts D–1 so as to complete the energizing circuit for the forward drive magnetic coupling 8, and thereby restore the forward movement of the tape 7. The various messages which were previously recorded on the tape 7 are now played back by the record playhead 22 to the calling subscriber over the telephone company lines L1 and L2 in conventional manner well known in the art.

After the last of the previously recorded messages is played back, the previously recorded index tone is also played back through the record playhead 22 through the closed contacts T.G.–2 of T.G. relay 19 and through the play amplifier 43 into the tone responsive tank circuit 44. The tank circuit 44 is constituted by a variable capacitor 45 and by inductor 46, and is tuned to the frequency of the index tone which was previously generated by the T.G. tank circuit 20 and which was recorded on tape 7. The output of the tone-responsive tank circuit 44 is applied through a resistor 51 and a capacitor 52 to a switching amplifier 47, and through the closed contacts D–3 of the drive relay 26 to energize a tone-responsive relay 48. The resistor 51 and the capacitor 22 form a time-delay network of approximately one-half second. This requires that the index tone play-out from the tank circuit T.R.–44 must continue for at least one-half a second in order for the switching amplifier 47 to be energized. The function of the time constant circuit 51–52 is to prevent the inadvertent energization of the switching amplifier 47 by spurious and random signals of the proper frequency. The energization of the tone-responsive relay 48 creates a charging path for capacitor C38B through lead 23, from ground, through lead 49, through the make contacts T.R.–1 of the energized tone-responsive relay 48 to the negative supply terminal. After the index tone has been fully played back, the switching amplifier 47 is rendered inoperative. This results in the deenergization of the tone-responsive relay 48 which, in turn, establishes a discharge path for the capacitor C38B through the coil of the drive relay 26, so as to energize the latter.

The discharge path for capacitor C38B extends from one side of the latter through leads 24 and 27, through the drive relay coil 26, through lead 28, through the closed contacts T.R.–2 of the tone-responsive relay 48, through lead 50, to the other side of the capacitor, so as to operate the drive relay 26. The energization of the drive relay 26 results again in the deenergization of the forward drive magnetic coupling 8 as a result of the opeinng of the closed contacts D–1 of the drive relay 26, so as to terminate the forward movement of the message tape 7. As a result, it will be apparent that the recorded index tone functions as a command signal so as to signal the recording apparatus to terminate the playback operation thereof.

In addition, operation of the drive relay 26 functions to energize the rewind drive magnetic coupling 9 over contacts D–2 of the drive relay, thereby to rewind the tape 7 for the period that the drive relay remains energized. This period is a function of the position to which the code mode switch 10 has been preset by the subscriber, namely, the zero position or the accumulate position, as will be described in a subsequent portion of this specification. The reason that tape 7 is caused to be rewound after termination of the messages repeat-back will also be discussed in a further portion of the specification.

It should be noted that in order to provide an adequate interval of index tone playout for purposes of satisfying the time constant network of amplifier B, i.e., resistor 51 and capacitor 52, it must be provided that an adequate interval of tone is recorded on tape 7 during the recording mode. It follows, therefore, that a scheme must be employed so that rewind of tape 7 will commence only after a suitable interval of tone has been recorded onto tape 7. This is accomplished by maintaining the apparatus in the record mode for the duration that the tone generator tank 20 is generating a tone, being controlled by the energization of the T.G. relay 19. Energization of the T.G. relay is in turn maintained for the duration of code signal transmission by the decoding subscriber. It follows, therefore, that if the subscriber sustains the code signal transmission for a sufficient time interval, as prescribed, an ample length of index tone will be recorded onto tape 7. The subscriber is accordingly instructed to sustain the transmission of the code signal for approximately three seconds. This provides ample length of tone to overcome the time constant network of switching amplifier A–15, i.e., resistor 16 and capacitor 17, as well as allowing a sufficient residue of tone to operate the T.G. tank 20 long enough to record sufficient length of tone onto tape 7, e.g., about two seconds.

Now when the playback of the recorded index tone occurs, there will be sufficient length of tone playback provided to satisfy the time constant network, resistor 51 and capacitor 52, of amplifier B–47, as well as maintaining the T.R. relay energized long enough to charge capacitor C38B, ultimately resulting in the energization of the drive relay 26. The utility of capacitor C38B will be more particularly appreciated in connection with the code mode switch SW–10, in the instance where SW–10 is set in the accumulated position, as will be described in a subsequent portion of the specification.

To accomplish the delay of the start of the rewind of tape 7 subsequent to a successful code signal transmission, as discussed above, the rewind operation of the apparatus is made dependent on the deenergization of the T.G. relay 19 which takes place after discontinuance of code signal transmission by the subscriber. The release of the T.G. relay serves to discharge capacitor C38A, causing activation of the drive relay 26, which in turn sets the tape drive mechanism into rewind motion. The discharge path of C38A is dependent upon the reenergization or re-closing of the T.G. relay 19 contacts T.G.–4.

As already mentioned earlier, the tape 7 is committed to rewind after the remote repeat-back of the messages. The reason for this is so as to assure the erasure of the recorded index tone by the erase head 53 on receipt of subsequent incoming calls, thus preventing an old index tone from prematurely, erroneously, signalling the termination of a remote repeat-back sequence. In the accumulate setting of SW–10, subsequent incoming calls will be recorded on the message tape 7 following an earlier sequence of recording; whereas in the zero setting of SW–10, subsequent incoming messages are recorded at the beginning of the message tape, resulting in the erasure by erase head 53 of previously existing recordings on the portion of the tape that is now recording a new incoming message.

In the zero position, a holding path is established for the drive relay over contacts D–4 and contacts 1 and 3 of SW–10 to negative power supply. The tape will accordingly rewind to the very beginning, at which point the conductive strip 40 will bridge the rewind sensing terminals 39, applying a short across the drive relay 26, deactivating it, and terminating the rewind performance, as has already been described in an earlier portion of the specification.

In the accumulate setting of SW–10, the drive relay 26 is maintained energized for a short duration only, being a function of the discharge rate of capacitor C38B, thus rewinding tape 7 for a correspondingly short interval.

Upon reflection it becomes evident that by using the zero setting, the capacity for recording time of the apparatus is virtually interminable, because after every remote decoding sequence the tape is returned to its initial position and is again in standby readiness for receipt and recording of new incoming messages. Thus, an option is provided to the subscriber by means of which he may elect to condition the apparatus for the acceptance of an unlimited number of incoming calls or for recording a predetermined number of calls by the manner in which the code switch SW–10 is pre-set.

Reverting back to the rewind modes of the apparatus, both prior and subsequent to the remote repeat-back of the messages, it should be noted that due to the greatly accelerated speed of the tape in the rewind direction a problem presents itself in the rewind mode. The problem results from the fact that various frequency characteristics are produced as a result of the fast rewind of the recorded messages. Some of these produced frequencies may inadvertently energize the frequency responsive means. As a result, two pairs of normally closed drive relay contacts D–3 and D–5 of the drive relay 26 are connected in circuit with the switching amplifiers 15 and 47 respectively, so as to deenergize these amplifiers during the rewind operation of the apparatus.

I claim:

1. In a telephone answering apparatus in association with a telephone having means to playback recorded messages over a telephone circuit, means to record incoming messages on a tape, and remotely operated playback means to playback said recorded incoming telephone messages, said remotely operated playback means including decoding signal frequency responsive means and an index tone generating circuit, said decoding signal frequency responsive means is operable in response to receipt of a decoding signal transmission to in turn actuate said index tone, and said apparatus recording said index tone on said tape, terminating means to terminate said playback of said recorded incoming telephone messages, said terminating means comprising index tone responsive means operable in response to a play-out of said recorded index tone to terminate said playback of said recorded messages.

2. A telephone answering apparatus as in claim 1, wherein said remotely operated playback means comprises tape transport means, said tape transport means having a motor for driving said tape, and means to deactivate said tape transport means upon energization of said index tone responsive means in response to the playback of said pre-recorded index tone.

3. A telephone answering apparatus as in claim 1, wherein said remotely operated playback means comprises tape transport means, said tape transport means having a motor for driving said tape, said transport means including means to propel said tape in a forward direction, and means to propel said tape at an accelerated speed in a rewind direction, said index tone responsive means being operable in response to a playback of said pre-recorded index tone to deactivate said forward propelling means and to activate said rewind propelling means.

4. In a telephone answering apparatus in association with a telephone having means to playback recorded messages over a telephone circuit, means to record incoming messages on a tape, and remotely operated playback means to playback said recorded incoming telephone messages, terminating means to terminate said playback of said recorded incoming telephone messages, said terminating means comprising index tone responsive means operable in response to a pre-recorded index tone to terminate said playback of said recorded messages, and wherein said remotely operated playback means comprises tape transport means, said tape transport means having a motor for driving said tape, said transport means including means to propel said tape in a forward direction, and means to propel said tape at an accelerated speed in a rewind direction, said remotely operated playback means including means for disabling said index tone responsive means during said rewind of said tape.

5. In a telephone answering apparatus in association with a telephone having means to playback recorded messages over a telephone circuit, means to record incoming messages on a tape, and remotely operated playback means to playback said recorded incoming telephone messages, terminating means to terminate said playback of said recorded incoming telephone messages, and wherein said remotely operated playback means comprises tape transport means, said tape transport means having a motor for driving said tape, said transport means including means to propel said tape in a forward direction, and means to propel said tape at an accelerated speed in a rewind direction, said terminating means comprising index tone responsive means operable in response to a playback of a pre-recorded index tone to deactivate said forward propelling means and to activate said rewind propelling means, and selective control means operable in a first position thereof to cause said tape to be rewound fully to its starting condition subsequent to said operation of said index tone responsive means and operable in a second position thereof to restrict the extent and duration of said rewind subsequent to said operation of said index tone responsive means to a portion of said tape substantially within the region of said pre-recorded index tone.

6. A telephone answering apparatus as in claim 5, and capacitor means, said restricted rewind extent and said duration being a function substantially of the electrical discharge time-rate characteristic of said capacitor means.

References Cited

UNITED STATES PATENTS

| | | | |
|---|---|---|---|
| 2,784,254 | 3/1957 | Lane | 179—6 |
| 3,136,856 | 6/1964 | Zimmermann | 179—6 |
| 3,293,365 | 12/1966 | Mitsui | 179—6 |
| 3,310,629 | 3/1967 | Yamamoto et al. | 179—6 |
| 3,337,690 | 8/1967 | Martin | 179—6 |

JAMES W. MOFFITT, Primary Examiner

R. F. CARDILLO, Jr., Assistant Examiner